United States Patent
Veasey, III

(10) Patent No.: US 9,497,954 B1
(45) Date of Patent: Nov. 22, 2016

(54) APPARATUS AND METHOD FOR HOLDING A FUMIGANT CONTAINER IN RELATION TO AN INTERIOR OF A BULK MATERIAL CONTAINER

(71) Applicant: Robert L. Veasey, III, Houston, TX (US)

(72) Inventor: Robert L. Veasey, III, Houston, TX (US)

(73) Assignee: HENDEE ENTERPRISES, INC., Houston, TX (US)

( * ) Notice: Subject to any disclaimer, the term of this patent is extended or adjusted under 35 U.S.C. 154(b) by 459 days.

(21) Appl. No.: 14/075,558

(22) Filed: Nov. 8, 2013

(51) Int. Cl.
  *A01M 13/00* (2006.01)
  *B61D 17/00* (2006.01)
  *A01M 1/20* (2006.01)

(52) U.S. Cl.
  CPC ......... *A01M 13/003* (2013.01); *A01M 1/2022* (2013.01); *B61D 17/00* (2013.01)

(58) Field of Classification Search
  CPC .............................. A01M 13/003; A61D 7/00
  USPC .................. 43/125, 131; 224/29.5, 572, 311
  See application file for complete search history.

(56) References Cited

U.S. PATENT DOCUMENTS

| | | | | |
|---|---|---|---|---|
| 1,016,648 A | * | 2/1912 | Snell | A61L 9/127 206/0.5 |
| 1,578,675 A | * | 3/1926 | Moon | B60J 1/2011 224/311 |
| 1,621,558 A | * | 3/1927 | Pearson | B61D 37/003 105/325 |
| 1,856,062 A | * | 4/1932 | Houghton | A01M 13/003 206/0.5 |
| D109,918 S | * | 5/1938 | McDonald | 224/29.5 |
| 2,251,050 A | * | 7/1941 | Stewart | B60Q 3/025 105/325 |
| 2,545,160 A | * | 3/1951 | Miller | A01M 17/006 116/DIG. 22 |
| 2,629,628 A | * | 2/1953 | Vaillancourt | A01M 1/24 239/53 |
| 2,727,621 A | * | 12/1955 | Fillion | B65D 81/07 206/335 |
| 2,738,224 A | * | 3/1956 | Checkovich | A61L 9/12 239/57 |
| 2,752,864 A | * | 7/1956 | McDougal, Sr. | B61D 45/006 410/130 |
| 2,827,177 A | * | 3/1958 | Mealing | B60R 5/003 105/325 |
| 2,857,630 A | * | 10/1958 | Bishop | B62D 29/04 105/423 |

(Continued)

*Primary Examiner* — Justin Larson
(74) *Attorney, Agent, or Firm* — Egbert Law Offices, PLLC

(57) ABSTRACT

An apparatus for holding a fumigant container has a sleeve with an interior volume, a first fastener affixed to the sleeve adjacent an end of the sleeve and extending outwardly therefrom, and a second fastener affixed to the sleeve adjacent the opposite end thereof. The first and second fasteners are suitable for removably affixing to at least an exterior surface, such as a pair of rails of a hopper car. Each of the fasteners includes a clip and a strap affixed to the clip. The clip includes a body formed of a polymeric material and having an aperture formed therethrough and an arm having one end integrally formed at the body and extending into the aperture such that the arm is flexible in relation of the body. The sleeve has at least one surface formed of a gas-permeable material. One end of the sleeve is open so as to allow for the introduction of a fumigant container into the interior of the sleeve.

8 Claims, 3 Drawing Sheets

(56) References Cited

U.S. PATENT DOCUMENTS

| | | | | |
|---|---|---|---|---|
| 2,962,219 A * | 11/1960 | Curran | A01M 1/2055 | 239/60 |
| 3,041,684 A | 7/1962 | Dawson et al. | | |
| 3,097,916 A | 7/1963 | Dawson et al. | | |
| 3,098,703 A * | 7/1963 | Snyder | A01M 1/2055 | 220/87.1 |
| 4,094,639 A * | 6/1978 | McMillan | A61L 9/12 | 239/58 |
| 4,667,430 A * | 5/1987 | Ziese, Jr. | A01M 31/008 | 119/711 |
| 4,696,237 A * | 9/1987 | Miller | B61D 7/02 | 105/248 |
| 5,055,277 A * | 10/1991 | Gunn | A01M 17/008 | 239/57 |
| 5,074,439 A * | 12/1991 | Wilcox | A01M 31/008 | 206/38 |
| 5,102,020 A * | 4/1992 | Walker | B65D 43/18 | 220/476 |
| 5,239,772 A * | 8/1993 | Burian | A01M 17/008 | 105/377.01 |
| 5,288,001 A * | 2/1994 | Locarno | A61G 5/10 | 224/407 |
| 5,555,663 A * | 9/1996 | Burgeson | A01M 31/008 | 239/53 |
| 5,595,123 A * | 1/1997 | Tao | B61D 17/045 | 105/396 |
| 5,601,034 A * | 2/1997 | Tao | B61D 17/045 | 105/397 |
| 5,743,650 A * | 4/1998 | Shannon | A61G 5/10 | 224/407 |
| 5,906,298 A * | 5/1999 | Ward | A61L 9/127 | 222/175 |
| 6,098,860 A * | 8/2000 | Phillips | B60N 3/103 | 224/482 |
| 6,105,839 A * | 8/2000 | Bell | B60N 3/004 | 220/6 |
| D551,862 S * | 10/2007 | Gerry | D3/300 | |
| D587,762 S * | 3/2009 | Zeyfang | D12/400 | |
| 7,562,408 B1 * | 7/2009 | Johnson | B62D 33/0612 | 224/572 |
| 7,908,791 B1 * | 3/2011 | Brash | A01M 13/003 | 43/125 |
| 8,087,859 B2 * | 1/2012 | Nelson | B61D 45/006 | 410/130 |
| 8,733,605 B2 * | 5/2014 | Pedrini | B60R 9/10 | 224/488 |
| D761,409 S * | 7/2016 | Bowen | D23/368 | |
| 2002/0159872 A1 * | 10/2002 | Scartelli | B60R 99/00 | 414/542 |
| 2008/0251514 A1 * | 10/2008 | Fitzpatrick | A01M 13/003 | 220/86.1 |
| 2009/0020574 A1 * | 1/2009 | Sloan | A01D 34/001 | 224/401 |
| 2009/0039128 A1 * | 2/2009 | Damico | B60R 9/00 | 224/572 |
| 2012/0102818 A1 * | 5/2012 | Rogacki | A01M 13/003 | 43/125 |
| 2013/0055619 A1 * | 3/2013 | Stewart | A01M 31/008 | 43/1 |
| 2014/0352571 A1 * | 12/2014 | Veasey, III | B61D 7/00 | 105/377.08 |

* cited by examiner

APPARATUS AND METHOD FOR HOLDING A FUMIGANT CONTAINER IN RELATION TO AN INTERIOR OF A BULK MATERIAL CONTAINER

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to the shipment of food products, such as grain. More particularly, the present invention relates to the fumigation of such food products during the transport of the food product in a bulk material container. Additionally, the present invention relates to rail cars, such as hopper cars, which require the use of a fumigant for treating a food product contained within the hopper car.

2. Description of Related Art Including Information Disclosed Under 37 CFR 1.97 and 37 CFR 1.98

Fumigant pesticides routinely are used to protect grains and legumes from insect damage during transport and storage. Before 1986, carbon tetrachloride and carbon disulfide mixtures were the primary fumigants used during rail transport. When these products were banned by the U.S. Environmental Protection Agency, fumigation using phosphorus and sulfur compounds increased. Aluminum phosphide, which is highly insecticidal, has been used increasingly by the grain industry. Aluminum phosphide pellets, deposited into a loaded boxcar, react with moisture in the gain to create the toxic gas phosphine. This reaction can occur within five minutes. The U.S. Department of Transportation requires that, after a loaded car is fumigated, it should remain out of transit for 48 hours. Once the gas completely dissipates, the food product is nontoxic.

Fumigants, such as aluminum phosphide, can liberate toxic gases that are rapidly absorbed through the respiratory tract. Symptoms may begin immediately and can include fatigue, headache, nausea, vomiting, abdominal pain, cough, and shortness of breath. Acute poisoning, such as occurs after inhalation of phosphine, can lead to pulmonary edema, central nervous system depression, toxic myocarditis, and circulatory collapse. As such, throughout the treatment of grains during transport, it is of increasing importance to minimize the amount of contact between the fumigant and the workers that may be handling such a fumigant. It is also important to avoid the dispersion of such gases throughout the environment.

Railroad hopper cars and tank cars carrying food items such as flour, corn syrup or other food products are sometimes treated during shipment to prevent contamination by insects or other pests. This is particularly true where temperatures over 50° F. are expected to be encountered. One way this has been done is by fumigating the car interior. Fumigant is introduced by means of packages which are kept in field containers until a shipper is ready to use them. In the past, the fumigant packages have been simply taped to corrugated cardboard panels or disks that are placed over the hatch opening or coaming, with the fumigant facing down in the car. A plastic cover is taped over the top of the cardboard, and then the hatch cover is closed. Exposure of the fumigant package to air causes a chemical reaction which releases a fumigant, such as a hydrogen phosphide, into the car.

The corrugated cardboard mounting method used in the past leads to several problems. Taping the fumigant packages to the cardboard is a handling problem. Installing the cardboard in the hatch openings is laborious and slow. The cardboard panels or disks present disposal problems. The corrugations of the cardboard present inviting hiding places for insects which, although they are killed by the fumigant, can be a contamination hazard upon unloading. That is, they tend to fall out of the corrugations into the interior of the railcar when the cardboard is removed for unloading. Additionally, such fumigant packages may accidentally release from the cardboard during transport. As a result, the material of the fumigant packages can come into direct contact with grain, or other bulk material, within the interior of the rail car so as to contaminate the product within the rail car. Once again, this prior technique of affixing the fumigant packages to the cardboard panels is time consuming, inefficient, ineffective and present potential safety problems. As such, a need has developed so as to avoid the use of the cardboard mounting technique.

In the past, various patents and patent publications have published relative to the fumigation of containers of food product, such as grain and legumes. For example, U.S. Pat. No. 2,857,630, issued on Oct. 28, 1958 to F. S. Bishop, describes a system for substantially eliminating insect infestation in cars, bins, and the like. In particular, this patent describes a fumigant composition which includes carbon tetrachloride, carbon disulfide and petroleum ether. This fumigation product is introduced directly into the grain within the car or bin.

U.S. Pat. No. 3,041,684, issued on Jul. 3, 1962 to Dawson et al., describes a process for the fumigation of grains. In particular, this fumigation technique is used in association with a grain storage structure having an opening at the top and an air duct at the bottom. An air-tight bonnet of flexible sheet material is releasably secured over the top opening. The bonnet has a tubular arm projecting outwardly therefrom. An air-tight plenum chamber is releasably secured to the fan so as to form a air-tight seal. The fumigation is directed into the plenum chamber so as to properly fumigate grain being stored in the grain storage structure.

U.S. Pat. No. 3,097,916, issued on Jul. 16, 1963 to Dawson et al., describes a similar apparatus to that of U.S. Pat. No. 3,041,684.

U.S. Pat. No. 5,055,277, issued on Oct. 8, 1991 to L. H. Gunn, describes a fumigating apparatus for shipping containers. This fumigating apparatus includes a long, flexible chain or string of gas-permeable solid fumigant holders, and a long, rigid pole or thrusting member. The holders are joined at predetermined intervals within the string by means of pre-cut lengths of rope or cord. The pole is attached to a distal-most one of the holders and is used to thrust the string of holders into the container through its open end and into the headspace above the commodity to be fumigated. The pole is then detached from the string and removed from the container to leave the string in place.

U.S. Pat. No. 5,239,772, issued on Aug. 31, 1993 to Burian et al., provides a railroad car pesticide device holder which has a frame resting in a hatch coaming. The frame has a gas-permeable underside support sheet and an impervious upper membrane. Pesticide devices, such as fumigant packages, rest between the support sheet and membrane. A separator is provided to prevent contact between the fumigant packages.

U.S. Pat. No. 7,908,791, issued on Mar. 22, 2011 to K. G. Brash, discloses a fumigation apparatus that includes a conventional shipping container. A partition divides the container into a fumigation chamber and a control room. A means is arranged to supply gas into the fumigation chamber. A control means is located in the control room so as to control the flow of gas into the fumigation chamber. An extraction means is provided so as to remove gas from the fumigation chamber.

U.S. Patent Publication No. 2008/80251514, published on Oct. 16, 2008 to Fitzpatrick et al., shows a shipping container which has a pair of gas portals fitted thereto. One portal is located in an uppermost stiffening groove or recess positioned in an end door of the container, and a second portal being located in a lowermost stiffening groove or recess located in the same end door. The uppermost portal is coupled to a fumigant introducing means in the form of a fumigant tank containing a source of liquefied fumigant reagent, a heater, an inlet fan and a gas hose located between each of these items. A further hose is connected to the uppermost portal.

U.S. Patent Publication No. 2012/0102818, published on May 3, 2012 to Rogacki et al., teaches the fumigation of containerized cargo. A portable fumigation containment door is installed in covering relationship with main rear opening of a cargo container. An inflatable gasket extends around the perimeter of the containment door and is inflated to create an airtight seal between the cargo container and the containment door. The door is provided with a series of connection ports for receiving fumigant injection and sampling lines necessary for performing the fumigation process.

It is an object of the present invention to provide an apparatus and method for holding a fumigant container which avoids the need to tape the fumigant container to a corrugated cardboard sheet.

It is another object of the present invention to provide an apparatus and method for holding a fumigant container which is efficient to utilize.

It is another object of the present invention to provide an apparatus and method for holding a fumigant container that limits exposure of the fumigant to the worker.

It is still a further object of the present invention to provide an apparatus and method for holding a fumigant container that avoids inconsistent application of the fumigant to the material within the bulk material container.

It is a still a further object of the present invention to provide an apparatus and method for holding a fumigant container which distributes the fumes of the fumigant evenly.

It is still a further object of the present invention to provide an apparatus and method for holding a fumigant container which avoids contact between the fumigants and the bulk material with the container These and other objects and advantages of the present invention will become apparent from a reading of the attached specification and appended claims.

BRIEF SUMMARY OF THE INVENTION

The present invention is an apparatus for holding a fumigant container that comprises a sleeve, a first fastener affixed to the sleeve and extending outwardly therefrom, and a second fastener affixed to the sleeve and extending outwardly therefrom. The sleeve has a first end, a second end, a first surface and a second surface. The sleeve has an interior volume defined by the first and second ends and the first and second surfaces. The interior volume is suitable for receiving the fumigant container therein. The first fastener is affixed to the sleeve adjacent one of the first and second ends. The second fastener is affixed adjacent to the sleeve adjacent to the other of the first and second ends and extends outwardly therefrom. The first and second fasteners are suitable for removably affixing the sleeve to at least an exterior surface.

The first fastener is affixed to one of the first and second surfaces. The second fastener is also affixed to the same surface. The sleeve has a first side and a second side. The first side and the second side extend between the first and second ends. The first fastener is affixed adjacent to the first side. The second fastener is also affixed to the first side. A third fastener is affixed adjacent to the second side and adjacent to the first end. A fourth fastener is affixed adjacent to the second side and adjacent to the second end.

In the present invention, each of the first and second fasteners includes a clip, and a strap having one end affixed to the clip and an opposite end affixed to the sleeve. The clip includes a body formed of a polymeric material. The body has an aperture formed therethrough. An arm has one end integrally formed with the body and extending into the aperture. The arm is flexible in relation to the body. The arm has a flange formed at an end thereof. The flange extends in generally transverse relationship to the arm.

In the present invention, the first end of the sleeve is open and the second end of the sleeve is closed. At least one of the first and second surfaces is formed of a pliable gas-permeable material.

The present invention is also an apparatus that includes a bulk material container having a pair of rails positioned adjacent a top thereof and positioned over an interior of the bulk material container, a sleeve affixed to the pair of rails so as to extend between the pair of rails, and a fumigant container positioned in the interior volume of the sleeve.

In this apparatus, the sleeve has a first fastener affixed to one of the pair of rails and a second fastener affixed to the other of the pair of rails. The sleeve has a third fastener affixed to the one of the pair of rails and a fourth fastener affixed to the other of the pair of rails. The bulk material container is in the nature of a hopper car. The fumigant container is positioned in the sleeve in a position between the pair of rails so as to open to the interior of the bulk material container. The sleeve has a first surface and a second surface. The fumigant container is positioned between the first and second surface of the sleeve. At least one of the first and second surfaces is of a gas-permeable material. The sleeve has an open end and a closed end. The fumigant container can be inserted into the sleeve through the open end.

The present invention is also a method of introducing fumigant into an interior of a bulk material container. This method includes the steps of: (1) placing a fumigant container into an interior of a sleeve; (2) affixing one end of the sleeve to one of the pair of rails of the bulk material container; and (3) affixing another end of the sleeve to the other of the pair of rails of the bulk material container. The fumigant container is positioned between the pair of rails such that the fumigant from the fumigant container is directed to the interior of the bulk material container. This method further includes the step of extending a gas-impermeable cover over a top of the sleeve and over a top of a pair of rails.

The foregoing Section is intended to describe, with particularity, the preferred embodiment of the present invention. It is understood that modifications to this preferred embodiment can be made within the scope of the present invention. As such, this Section should not to be construed, in any way, as limiting of the broad scope of the present invention. The present invention should only be limited by the following claims and their legal equivalents.

DETAILED DESCRIPTION OF THE INVENTION

Figure 1:
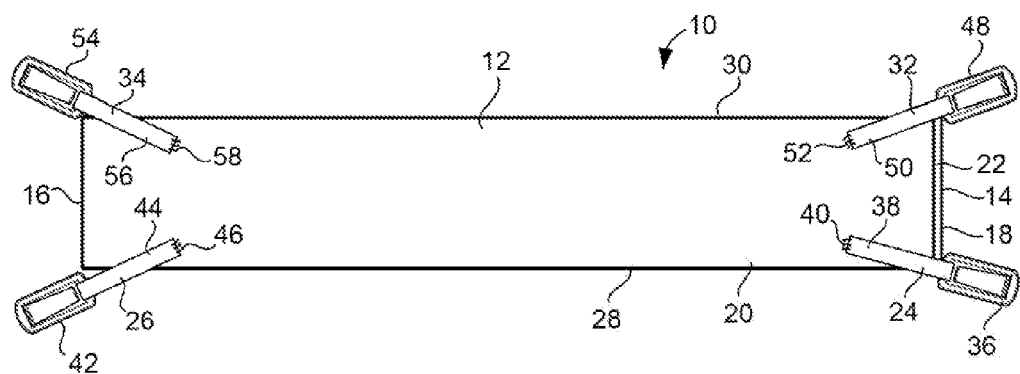
FIG. 1 is a plan view showing the apparatus for holding a fumigant container in accordance with the preferred embodiment of the present invention.

Referring to FIG. 1, there is shown the apparatus 10 for holding a fumigant container in accordance with the preferred embodiment of the present invention. The apparatus 10 includes a sleeve 12 having a first end 14 and a second end 16. The sleeve 12 also has a first surface 18 and a second surface 20. The ends 14 and 16 along with the surfaces 18 and 20 define an interior volume 22 of the sleeve 12. The interior volume 22 is suitable for receiving a fumigant container therein. A first fastener 24 is affixed to the sleeve 12 and extends outwardly thereof. The first fastener 24 is positioned generally adjacent to the first end 14 of the sleeve 12. A second fastener 26 is affixed to the sleeve 12 and extends outwardly therefrom. The second fastener 26 is affixed to the sleeve 12 generally adjacent to the second end 16. The fasteners 24 and 26 are suitable for securing the sleeve 12 to an exterior surface.

The sleeve 12 can be formed of a gas-permeable material. In the preferred embodiment of the present invention, both of the surfaces 18 and 20 are formed of a gas-permeable material. However, within the concept of the present invention, only one of the surfaces 18 and 20 can be formed of a gas-permeable material. The surface that is formed of a gas-permeable material should be facing the food product within the bulk material container.

The interior volume 22 has a size suitable for allowing the fumigant container to be inserted thereinto. In particular, the fumigant container can be inserted through the first end 14 of the sleeve 12. This first end 14 is open. The second end 16 is closed. The sleeve 12 also has first side 28 and a second side 30.

The first fastener 24 is affixed, by sewing or by other means, to the surface 20 of the sleeve 12. The first fastener 24 will be affixed to the sleeve 12 generally adjacent to the side 28. Similarly, the second fastener 26 is also affixed to the surface 20 of the sleeve 12 generally adjacent to the side 28. Each of the fasteners 24 and 26 will extend outwardly of the sleeve 12 at an acute angle with respect to side 28.

A third fastener 32 is affixed to the surface 20 of the sleeve 12 generally adjacent to the first end 14 and generally adjacent to the second side 30. A fourth fastener 34 is affixed to the surface 20 of the sleeve 12 generally adjacent to the second end 16 and the second side 30. In this configuration, the fasteners 24, 26, 32 and 34 are arranged so as to provide four points of the connection between the sleeve 12 and the rails associated with a bulk material container, such as a hopper car.

The first fastener 24 includes a clip 36 that is affixed to a strap 38. The strap 38 is affixed by stitches 40 to the surface 20 of the sleeve 12. The second fastener 26 includes a clip 42 that is affixed to a strap 44. The strap 44 is affixed by stitches 46 to the surface 20 of the sleeve 12. The third fastener 32 includes a clip 48 that is affixed to a strap 50. The strap 50 is affixed by stitches 52 to the surface 20 of the sleeve 12. Finally, the fourth fastener 34 has a body 54 that is affixed to a strap 56. The strap 56 is affixed by stitches 58 to the surface 20 of the sleeve 12.

Figure 2:
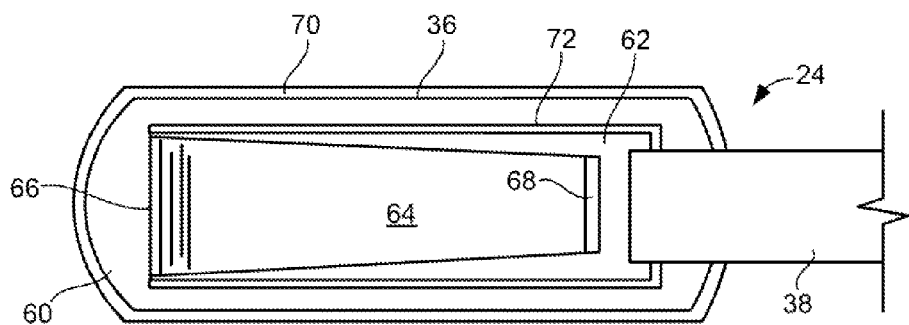
FIG. 2 is a plan view showing a fastener as used on the apparatus for holding a fumigant of the present invention.

FIG. 2 illustrates the configuration of the fasteners as used in the present invention. In particular, FIG. 2, for example, will show the fastener 24. Fastener 24 includes clip 36 and the strap 38. The clip 36 includes a body 60 that is formed of a polymeric material. The body 60 has an aperture 62 formed centrally thereof. An arm 64 is integrally connected at end 66 to the body 60. The arm 64 extends inwardly so as to taper toward an opposite end away from end 66. The arm 64 is disposed within the aperture 62. The arm 64 will include a flange 68 formed at the end of arm 64 opposite the end 66. As such, the arm 64 is flexibly mounted to the body 60 and within the aperture 62. An outer rib 70 is formed around the parameter of the body. Similarly, an inner rib 72 is formed around the aperture 62. The ribs 70 and 72 are configured so as to provide structural integrity to the clip 36. The use of the flange 68 further provides structural integrity to the arm 64. As such, the clip 36 will not deform when it is applied to the rails of a hopper car. The fasteners 26, 32 and 34 will have a similar configuration of that shown in FIG. 2.

Figure 3:
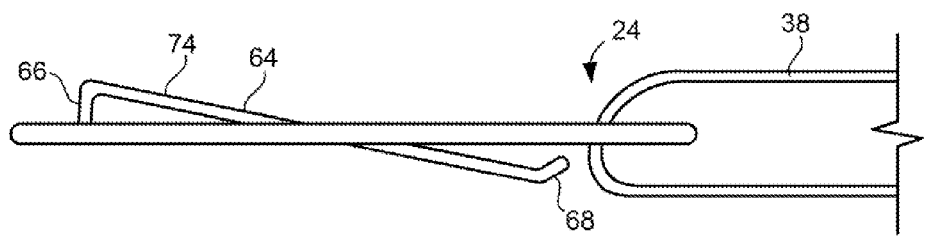
FIG. 3 is a side elevational view showing the fastener as used in the apparatus for holding a fumigant container in accordance with the preferred embodiment of the present invention.

FIG. 3 is a side view showing the fastener 24. In FIG. 3, it can be seen that the strap 38 extends so as to loop through the aperture 62 between the flange 68 of the arm 64 and the rib 72 of the aperture 62. The arm 64 has an upwardly extending portion at the end 66. A planar surface 74 of the arm 64 will extend between the end 66 and the flange 68. The flange 68 is illustrated as extending in transverse relationship to the plan of the planar portion 74 of arm 64. As such, the flange 68 can provide an area that suitably abuts the surfaces of the rails of the hopper car.

Figure 4:
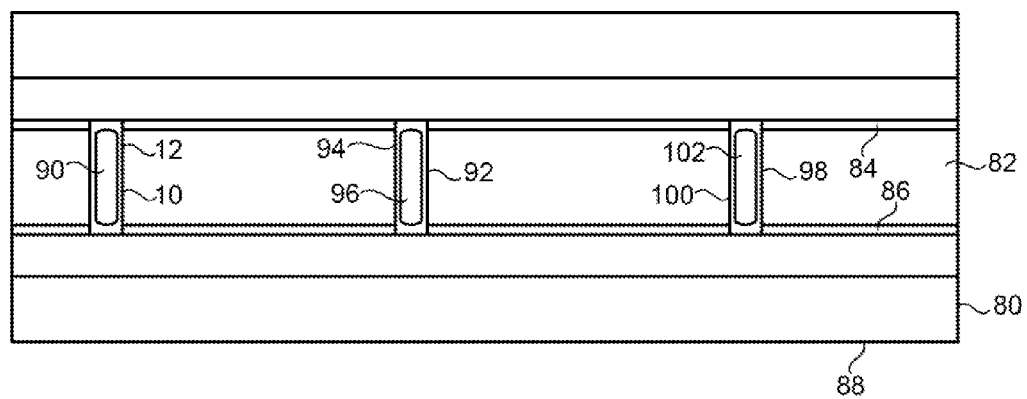
FIG. 4 is a plan view showing the application of the apparatus for holding a fumigant container onto the top of a rail car.

FIG. 4 shows the application of the apparatus 10 of the present invention onto a hopper car 80. The hopper car 80 is of a conventional construction having an interior 82 that is formed in the interior of the hopper car 80. As such, interior 82 is suitable for the receipt of a bulk material, such as grains or legumes. Rails 84 and 86 extend on opposite sides of the opening at the top 88 of the hopper car 80. Rails 84 and 86, as will be described hereinafter, have a generally inverted U-shaped configuration. In FIG. 4, it can be seen that the apparatus 10 has one end affixed to the rail 84 and an opposite end affixed to the rail 86. As such, the sleeve 12 will extend across the opening between the rails 84 and 86. In FIG. 4, it can be seen that a fumigant container 90 is received within the interior of the sleeve 12. FIG. 4 also shows that there are additional apparatus, similar to apparatus 10, that are applied in spaced relationship to each other along the length of the rails 84 and 86 of the hopper car 80. In particular, the apparatus 92 includes a sleeve 94 and a fumigant container 96 therein. Similarly, the apparatus 98 includes a sleeve 100 having a fumigant container 102 therein. The apparatus 10, 92, and 98 are configured such that the gas released from the fumigant containers 90, 96, and 102 is released so as to be directed toward the interior 82 of the hopper car 80. Importantly, so as to contain the fumes and to assure that the fumes are directed to the interior 82 of the hopper car 80, a gas-impermeable cover can be placed over the rails 84 and 86 and also over the apparatus 10, 92 and 98.

Figure 5:
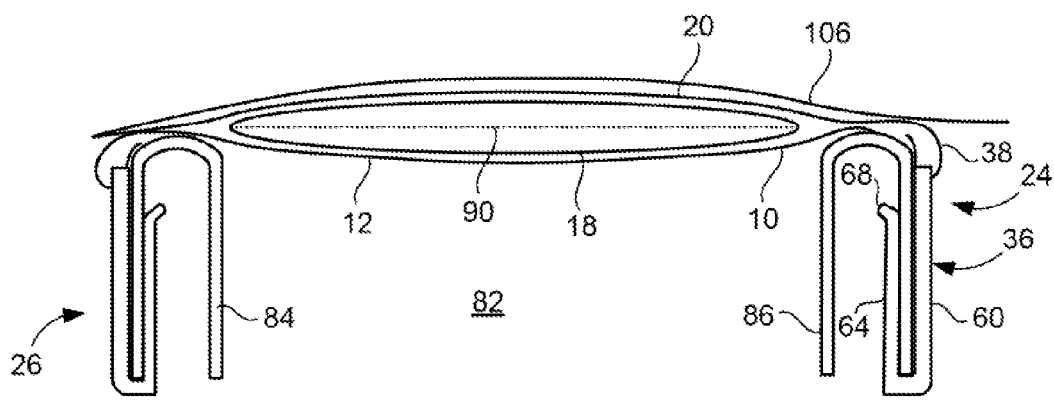
FIG. 5 is an end view showing the application of the apparatus for holding a fumigant container upon a pair of rails at the opening of the hopper car.

FIG. 5 shows how the apparatus 10 is applied over the rails 84 and 86. In particular, the apparatus 10 includes the sleeve 12 having the surface 18 and the surface 20. The first fastener 24 is secured to a surface of the inverted U-shaped rail 86. As such, the arm 64, along with the flange 68 will bear against the rail 86. The body 60 of the clip 36 will extend upwardly. Strap 38 will be affixed to the sleeve 12 so as to secure the end 14 of the sleeve 12 in position against the top of the rail 86. Similarly, the opposite end 16 of the sleeve 12 will be secured to the rail 84 in a similar manner. In particular, the fastener 26 is secured over a portion of the inverted U-shaped rail 84.

In this configuration, the sleeve 12 will extend between the rails 84 and 86. As such, the sleeve 12 will extend over the opening between the rails 84 and 86 so as to communicate within the interior 82 of the hopper car 80. In this configuration, it is only important that the surface 18 be of a gas-permeable material. As such, the fumes from the fumigant container 90 will directed downwardly toward the interior 82. In order to contain the fumes, a gas-impermeable cover 106 can be applied over the rails 84 and 86 and over the surface 20 of the sleeve 12. As such, the fumes from the fumigant container 90 will not disperse outwardly of the hopper car 80.

Figure 6:
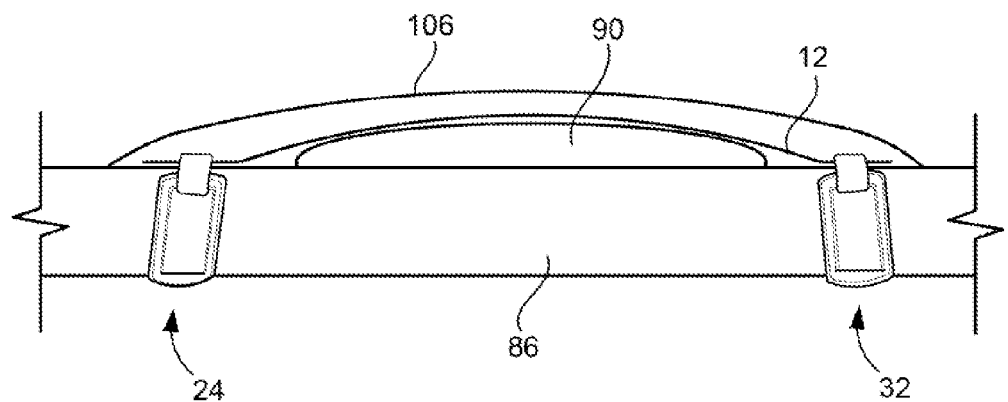
FIG. 6 is a side view showing the application of the apparatus for holding a fumigant container onto the rail of a hopper car.

FIG. 6 shows a side view and, in particular, the application of the fastener 24 and the application of the fastener 32 to the rail 86. As can be seen, the fasteners 24 and 32 are clipped onto the rail 86 such that the sleeve 12 will extend therebetween. The sleeve 12 has the fumigant container 90 therein. The cover 106 can be placed onto the top 88 of the hopper car 80 so as to contain the apparatus 10 and the fumigant container 90 thereon. The cover 106 can be applied by clips, adhesives, fasteners, or other devices.

The present invention achieves significant advantages over the prior art systems. First, and foremost, the use of the tape-on-cardboard technique is avoided. As such, by simply inserting the fumigant container into the sleeve, the fumigant container is in an arrangement suitable for application to the hopper car. It is only necessary to insert the fumigant container through the open end of the sleeve. The sleeve can then be easily and quickly clipped to the rail through the use of the unique clip arrangement of the present invention. As such, the fumigant container is maintained in a desired position over the material within the hopper car. It is then only necessary to apply the cover 106 over the top of the sleeve 12 and the fumigant container. After the transport of the bulk material has been completed and the fumigant has been dispersed, the fasteners of the present invention can be easily released from the rails of the hopper car for disposal. Except of the minor amount of time that the fumigant container is removed from its package and placed into the sleeve, the worker has a minimal amount of exposure to the fumigant container. Additionally, the present invention avoids any possibility of direct contact between the fumigant container and the food product that is maintained within the interior of the hopper car. Since the sleeve is gas-permeable, but not liquid permeable, any liquid fumigants will not pass to the grain product within the hopper car. In the prior tape-on-cardboard techniques, there is always the possibility of the adhesive releasing from the cardboard and causing the fumigant to drop into the material within the hopper car. The present invention provides a solid and secure locking system which should prevent this possibility from occurring. The use of the gas-permeable material for the sleeve of the present invention assures a more even distribution of the fumigant therefrom. In other words, as the fumigant becomes vaporized or gasified, it will disperse within the sleeve and then be released. As such, an even release of fumigant is achieved.

The forgoing disclosure and description of the invention is illustrative and explanatory thereof. Various changes in the details of the illustrated construction or in the steps of the described method can be made within the scope of the appended claims without departing from the true spirit of the invention. The present invention should only be limited by the following claims and their legal equivalents.

I claim:

1. An apparatus comprising:
   a bulk material container having a pair of rails positioned adjacent a top thereof, said pair of rails positioned over an interior of said bulk material container;
   a sleeve affixed to said pair of rails so as to extend between said pair of rails, said sleeve having an interior volume, said sleeve having a first fastener affixed to one of said pair of rails and a second fastener affixed to the other of said pair of rails, each of said first and second fasteners comprising:
   a clip affixed to the rail; and
   a strap having one end affixed to said clip and an opposite end affixed to said sleeve; and
   a fumigant container positioned in said interior volume of said sleeve.

2. The apparatus of claim 1, said sleeve having a third fastener affixed to said one of said pair of rails and a fourth fastener affixed to said other of said pair of rails.

3. The apparatus of claim 1, said clip comprising:
   a body formed of a polymeric material, said body having an aperture formed therethrough; and
   an arm having one end integrally formed with said body and extending into said aperture, said arm being flexible in relation to said body.

4. The apparatus of claim 3, said arm having a flange formed at an end thereof, said flange extending in generally transverse relationship to said arm.

5. The apparatus of claim 1, said bulk material container being a hopper car.

6. The apparatus of claim 1, said fumigant container positioned in said sleeve in a position between said pair of rails so as to open to said interior of said bulk material container.

7. The apparatus of claim 1, said sleeve having a first surface and a second surface, said fumigant container positioned between said first and second surfaces, at least one of said first and second surfaces being of a gas-permeable material.

8. The apparatus of claim 1, said sleeve having an open end and a closed end, said fumigant container inserted into said sleeve through said open end.

\* \* \* \* \*